US012594735B2

(12) United States Patent
Dougherty, Jr. et al.

(10) Patent No.: US 12,594,735 B2
(45) Date of Patent: Apr. 7, 2026

(54) ROTARY TABLET PRESS WITH REMOVABLE TURRET MODULE

(71) Applicant: INDUSTRIAL PHARMACEUTICAL RESOURCES, INC., Bartlett, IL (US)

(72) Inventors: Joseph I. Dougherty, Jr., Glen Ellyn, IL (US); Yan Chen, Aurora, IL (US)

(73) Assignee: Industrial Pharmaceutical Resources, Inc., Bartlett, IL (US)

( * ) Notice: Subject to any disclaimer, the term of this patent is extended or adjusted under 35 U.S.C. 154(b) by 188 days.

(21) Appl. No.: 18/390,482

(22) Filed: Dec. 20, 2023

(65) Prior Publication Data

US 2025/0205985 A1 Jun. 26, 2025

(51) Int. Cl.

| | |
|---|---|
| ***B30B 11/08*** | (2006.01) |
| ***B30B 11/00*** | (2006.01) |
| ***B30B 15/02*** | (2006.01) |
| ***B30B 15/04*** | (2006.01) |

(52) U.S. Cl.
CPC ............ *B30B 15/04* (2013.01); *B30B 11/005* (2013.01); *B30B 11/08* (2013.01)

(58) Field of Classification Search
CPC ............ B30B 15/0023; B30B 15/0082; B30B 15/026; B30B 15/028; B30B 15/32; B30B 11/08
See application file for complete search history.

(56) References Cited

U.S. PATENT DOCUMENTS

| | | | |
|---|---|---|---|
| 4,601,866 | A | 7/1986 | David |
| 5,253,572 | A | 10/1993 | Uehara |
| 6,361,302 | B1 | 3/2002 | Hinzpeter et al. |
| 6,676,863 | B2 | 1/2004 | Christiaens et al. |
| 6,830,442 | B2 | 12/2004 | Cecil |
| 8,025,498 | B2 | 9/2011 | Haase et al. |
| 8,277,707 | B2 | 10/2012 | Waldron |
| 9,314,946 | B2 | 4/2016 | Pannewitz |
| 9,840,055 | B2 | 12/2017 | Janke et al. |
| 10,052,836 | B2 | 8/2018 | Vogeleer et al. |

(Continued)

FOREIGN PATENT DOCUMENTS

WO 2011061564 A1 5/2011

OTHER PUBLICATIONS

"ECM-Based Rotary Tablet Presses", GEA Pharma Systems-Courtoy Technologies.

*Primary Examiner* — Thu Khanh T. Nguyen
(74) *Attorney, Agent, or Firm* — Wood, Phillips, Katz, Clark, & Mortimer

(57) ABSTRACT

A rotary tablet press comprises a machine frame comprising a press housing and a compression assembly in the press housing including pressure roll assemblies. A connection base extends outwardly from the press housing. A detachable turret module is removably mountable to the base assembly comprising a module base supporting a turret housing. A turret assembly is rotatably mounted in the turret housing about a vertical axis. The turret assembly comprises a plurality of die stations. The turret module is selectively positioned at the base assembly so that the pressure roll assemblies engage the turret assembly to compress a granulation into a tablet at the die stations. A cart is operatively secured to the module base and comprises a controllable lifting mechanism for raising and lowering the turret module to selectively position the module base on the connection base.

20 Claims, 17 Drawing Sheets

(56) References Cited

U.S. PATENT DOCUMENTS

| | | | |
|---|---|---|---|
| 10,449,119 | B2 | 10/2019 | Scheffler et al. |
| 2004/0207107 | A1 * | 10/2004 | Christiaens ......... B30B 15/0023 264/109 |
| 2006/0160684 | A1 * | 7/2006 | Springston ............ B30B 15/028 100/918 |
| 2010/0221374 | A1 | 9/2010 | Le Floc'H |
| 2011/0012283 | A1 | 1/2011 | Waldron |
| 2016/0361885 | A1 | 12/2016 | Oyama et al. |
| 2018/0178474 | A1 | 6/2018 | Vogeleer et al. |

* cited by examiner

ROTARY TABLET PRESS WITH REMOVABLE TURRET MODULE

CROSS-REFERENCE TO RELATED APPLICATIONS

There are no related applications.

FIELD OF THE INVENTION

This invention relates to rotary tablet presses and, more particularly to a removeable turret module.

BACKGROUND OF THE INVENTION

Oral dosage medication is typically manufactured by directly compressing granulation on a rotary tablet press. Tooling is used on the tablet press to identify and produce specific products. The tooling consists of an upper punch, lower punch, and a die. To form a tablet, granulated powder material must be fed into a cavity formed by two punches and a die. The punches are pressed together with sufficient force to fuse the powder into a tablet.

All granulations are abrasive and due to the force at compaction, tools wear out and must be replaced. Maintaining quality tooling is essential to product consistency. Cleaning is also frequently required.

In a rotary tablet press, a turret is rotatable about a vertical axis and carries a plurality of dies. Each die has associated top and bottom punches driven by top and bottom cams to compress the granulation into a tablet. For cleaning between batches or changeover for a different tablet, product containing parts including the turret with punches and cam, feeder, tablet discharge chute, and hopper are removable as units from the tablet press.

Such rotary tablet presses are provided by various manufacturers and described, for example, in U.S. Pat. Nos. 4,988,275 and 6,676,863 and EP1050399.

Prior art removable turret press designs incorporate a single press frame for structural support of the turret and pressure roll assemblies. These designs prevent the removal of the turret, feeder, tablet discharge chute, and hopper, along with the machine base on which they are supported. These designs generally require an operator to disconnect, move and/or remove several components including removing a heavy turret and loading it onto an ancillary cart in order to change the press to a different tooling size or configuration such as bi-layer or tri-layer. These designs also constrain the tablet press to only utilize turrets having the same diameter and height dimensions. Prior art designs require cleaning and great care in transferring the equipment to a cleaning room without risk of cross contamination. Prior art presses with removable or detachable turrets incorporate mechanisms that attach to and drive the turret from beneath. This not only requires an ancillary cart but also the requirement to disconnect, move and/or remove press components and lift and load the turret.

Pending application Ser. No. 17/326,653, filed May 21, 2021, owned by Applicant herein, discloses a rotary tablet press comprising a base assembly including a press housing and a compression assembly in the press housing including pressure roll assemblies. A detachable module is removably mountable to the base assembly comprising a module base supporting a turret housing. A turret assembly is rotatably mounted in the turret housing about a vertical axis. The turret assembly comprises a plurality of die stations. The detachable module is selectively positioned at the base assembly so that the pressure roll assemblies engage the turret assembly to compress a granulation into a tablet at the die stations. A turret drive assembly comprises a turret motor and drive shaft. The drive shaft is aligned with the vertical axis and engaging the turret assembly to rotate the turret assembly.

The present invention is directed to improvements in design of a removable turret, and the removal and changeover of product contact parts.

SUMMARY OF THE INVENTION

An object of the present invention is to provide a tablet press that is more configurable and flexible for tablet manufacturers, requires less time for changeover between batches, and contains dust generated during the tableting operation to minimize exposure to the operator. This is accomplished by housing the compression roll assemblies and turret assembly in two separate and distinct support structures that can be connected to one another and operate in unison as a tablet press.

In view of this objective, the press is divided into two primary assemblies herein referred to as the machine frame and detachable turret module. The machine incorporates motorized pressure roll assemblies that may move both linearly and axially. Having linear movement, the pressure rolls are automatically moved into a position, if necessary, to allow the turret module to be detached and removed from the base assembly without interference. The movement, if necessary, allows the compression assemblies housed in the base assembly to adjust tablet thickness during operation and to be configured for various turret modules containing turrets with different physical dimensions during setup.

In accordance with one aspect of the invention, a rotary tablet press comprises a machine frame comprising a press housing and a compression assembly in the press housing including pressure roll assemblies. A connection base extends outwardly from the press housing. A detachable module is removably mountable to the base assembly comprising a module base supporting a turret housing. A turret assembly is rotatably mounted in the turret housing about a vertical axis. The turret assembly comprises a plurality of die stations. The detachable module is selectively positioned at the base assembly so that the pressure roll assemblies engage the turret assembly to compress a granulation into a tablet at the die stations. A cart is operatively secured to the module base and comprises a controllable lifting mechanism for raising and lowering the detachable module to selectively position the module base on the connection base.

In accordance with another aspect of the invention, a rotary tablet press comprises a machine frame comprising a press housing and a compression assembly in the press housing including pressure roll assemblies, and a connection base extending outwardly from a bottom end of the press housing. A detachable module is removably mountable to the press housing comprising a module base including a control housing atop a support housing and a turret housing mounted atop the control housing, a turret assembly rotatably mounted in in the turret housing about a vertical axis, the turret assembly comprising a plurality of die stations, the detachable module being selectively positioned at the press housing so that the pressure roll assemblies engage the turret assembly to compress a granulation into a tablet at the die stations. A turret drive assembly comprises a turret motor and drive shaft, the drive shaft being aligned with the vertical axis and engaging the turret assembly to rotate the turret assembly. A cart is operatively secured to the module base and comprises a controllable lifting mechanism for raising and lowering the detachable module to selectively position the module base on the connection base.

Further features will be readily apparent from the specification and from the drawings.

DETAILED DESCRIPTION OF THE INVENTION

Figure 1:
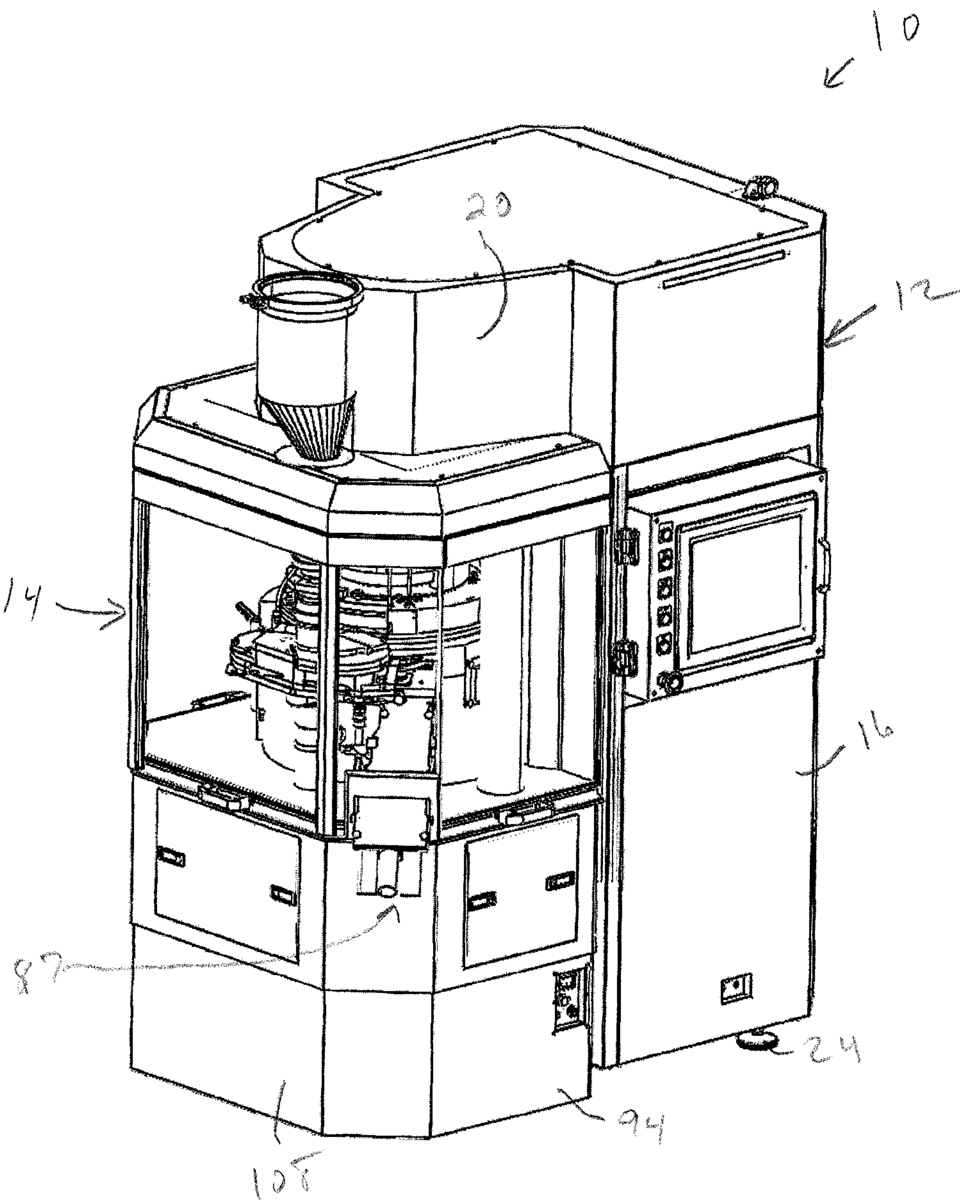
FIG. 1 is a perspective view of a rotary tablet press machine in accordance with the invention comprising a machine frame and a detachable turret module.

The present invention relates to a rotary tablet press comprising a base assembly or machine frame and detachable turret module. The machine frame incorporates motorized pressure roll assemblies and optionally a turret drive assembly. The detachable module comprises a module base, turret housing, turret, cam body, cams, feeder, tablet discharge chute, hopper, upper enclosure, and guard doors. The detachable module could also incorporate pressure roll assemblies for bilayer or trilayer applications. The turret comprises chambers arranged circumferentially to hold upper punches, lower punches, and dies. As the turret rotates, punches follow a cam track and reciprocate into and out of dies that receive granulation as they are rotated under the feeder. A tablet is formed when the punches contact the pressure rolls causing compaction of the granulation in the die.

The disclosed tablet press is more configurable and flexible for tablet manufacturers, requires less time for changeover between batches, and contains dust generated during the tableting operation to minimize exposure to the operator. This is accomplished by housing the compression roll assemblies and turret assembly in two separate and distinct support structures that can be connected to one another and operate in unison as a tablet press.

The press is divided into two primary assemblies herein referred to as the machine frame and the detachable turret module. The machine frame incorporates motorized pressure roll assemblies that may move both linearly and axially. Having linear movement, the pressure rolls are automatically moved towards or away from one another into a position, if necessary, to allow the turret module to be detached and removed from the press frame without interference. The axial movement allows the compression assemblies housed in the machine frame to adjust tablet thickness during operation and to be configured for various turret modules containing turrets with different physical dimensions.

The press frame may incorporate the turret drive mechanisms that enable the drive shaft to be mounted above the turret. This frees up space in the module below the turret for incorporating vacuum, cleaning features, or used for other requirements, and reduces heat in the tableting zone generated by a turret motor typically mounted beneath the turret. Additionally, the module cost and weight are reduced by not having to incorporate the drive motor and assembly in the module.

Isolating and housing the control components in the frame avoids the requirement for calibration of pressure roll positions, load cells or strain gages, and turret speed when a module is detached or attached.

A precision pneumatic, hydraulic, magnetic, physical connection, or other method is incorporated to secure the turret module to the machine frame. Alignment and mounting are designed to ensure the module can be precisely detached and attached to the frame without impacting the machine performance.

The detachable turret module comprising a module base, turret housing, turret, cam body, cams, feeder, tablet discharge chute, hopper, and guard doors eliminates the requirement for an external cart and significantly reduces the changeover time. An operator simply disconnects the powder inlet connection, presses a detach module button in the tablet press HMI software, disconnects cable connector(s), if required, and uses an automated guided vehicle (AGV), or other appropriate material handling mechanism, to remove the module in a matter of minutes. The AGV may be integrated into the detachable turret module or may be removable. In accordance with the invention the AGV comprises a controllable lifting mechanism for raising and lowering the detachable module to selectively attach the detachable module to the machine frame.

The illustrated and described rotary press machine improves upon the prior art tablet presses by isolating the pressure roll assemblies in a separate and distinct machine frame from a detachable turret module comprising of a turret and the base on which it is supported to provide a faster changeover, increased configurability, offline setup, and a safer solution for the customer and eliminating the need to lift and remove a heavy turret unit and load it onto an ancillary cart. Sealing the module minimizes the operator's exposure to granulation dust particles and enables the module to be transferred to a cleaning room with less risk of cross contamination. Prior art presses incorporate mechanisms that attach to and drive the turret from beneath. Having a detachable module that incorporates the turret supporting base eliminates the requirement for an ancillary cart as well as the requirement to disconnect, move and/or remove press components and lift and load the compression unit and/or turret.

Figure 2:
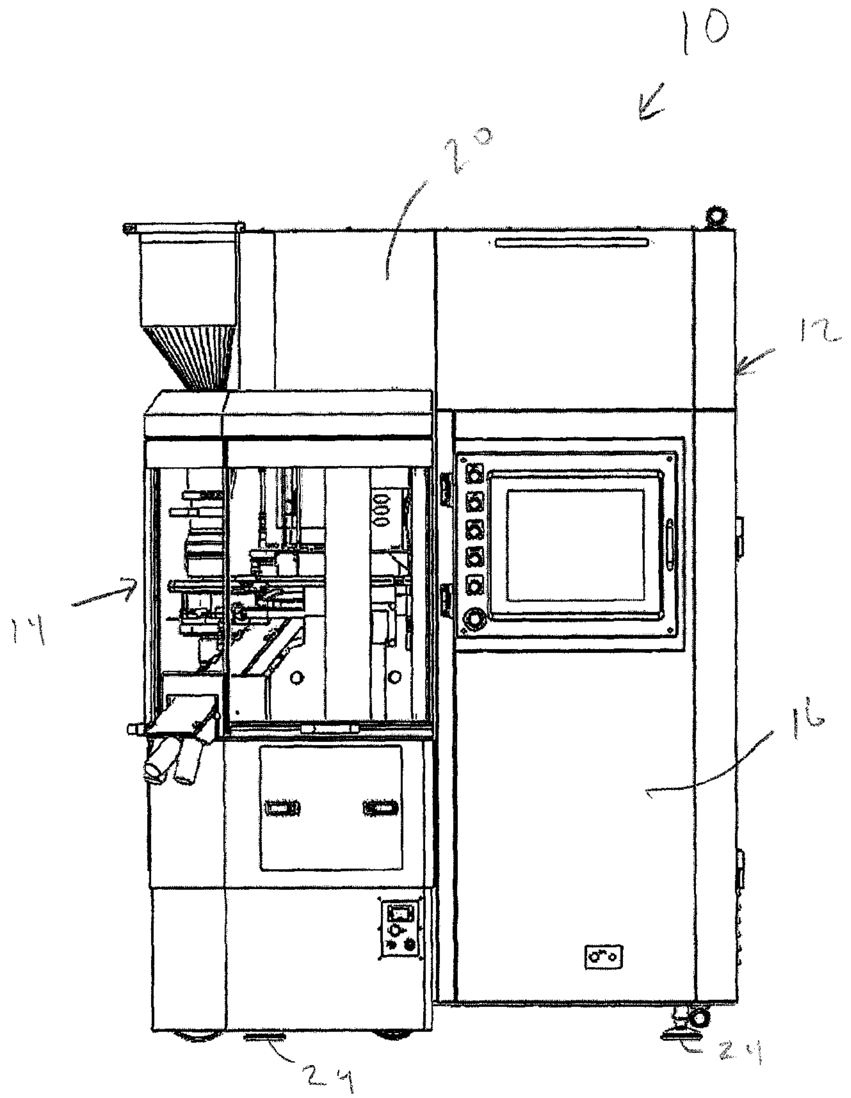
FIG. 2 is a right side view of the press machine of FIG. 1.

Referring initially to FIGS. 1 and 2, a rotary tablet press machine 10 in accordance with the invention is illustrated. The rotary tablet press machine 10 comprises a machine frame 12 and a removeable/detachable turret module 14, see also FIGS. 3-5.

In accordance with the invention, the machine frame 12 is designed to isolate the turret drive assembly and pressure roll assemblies, described below, in the machine frame 12 from the turret module 14 to provide a faster changeover, offline setup, increased configurability, and a safer solution for the customer. Having a detachable turret module 14 that incorporates the turret supporting base, described below, eliminates the requirement for an ancillary cart as well as the requirement to disconnect, move and/or remove press components and to lift and load the compression unit and/or turret.

The machine frame 12 comprises a press housing 16. The press housing 16 is generally parallelepiped in shape with a front inset portion 18 for receiving the detachable module 14. An upper end of the press housing 16 extends forwardly above the inset portion 18 and defines a drive housing 20 at the top of the press housing 16. A connection base 22 extends forwardly of the bottom of the press housing 16 and is aligned with the drive housing 20. A plurality of adjustable pads 24 are provided on an underside of the press housing 16 and connection base 22 for supporting and leveling the machine frame 12 on a ground surface.

Figure 6:
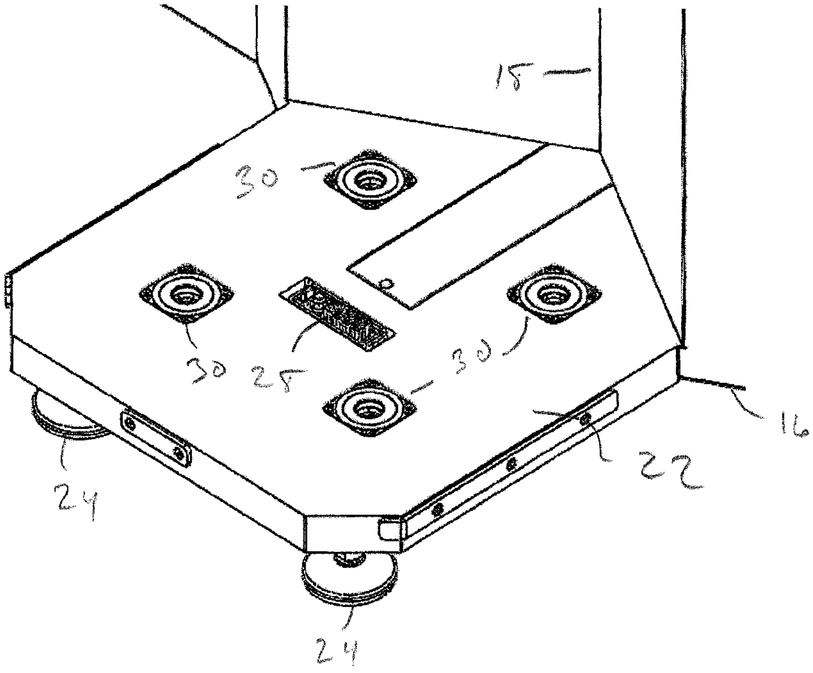
FIG. 6 is a cutaway perspective view of the machine frame illustrating connection components for mounting the turret module to the machine frame.

The press housing 16 includes interior space for control components (not shown) and includes an operator control panel 26. Provision is also made for providing necessary electrical connections between control devices in the press housing 16. Referring also to FIG. 6, the connection base 22 includes a female electrical quick connector 28 for providing electrical and pneumatic connections between the machine frame 12 and the detachable turret module 14, as described in greater detail below. The connection base 22 also includes four zero point clamp receivers 30 for mechanically securing the detachable turret module 14 to the machine frame 12.

The press housing 16 houses two motorized pressure roll assemblies 36 and 38. Some designs may use a single pressure roll assembly. The first roller assembly 36 has an upper roller 40 and a lower roller 42. The second roller assembly 38 has an upper roller 44 and a lower roller 46. The rollers 40 and 42 are in a plane 120° to that of the rollers 44 and 46. The roller assemblies 36 and 38 are driven by linear drives, one of which is shown at 56, see FIG. 17. Particularly, the linear drive 56 operates to move the rollers 44 and 46 towards or away from one another to engage or disengage a turret during operation. Similarly, another linear drive (not shown) operates to move the rollers 40 and 42 towards or away from one another.

The drive housing 20 supports a turret drive torque motor 62 which drives a downwardly depending drive shaft 64. The motor 62 is also configured to raise and lower the drive shaft 64 using a piston 66 to engage a turret for rotation therewith.

Figure 7:
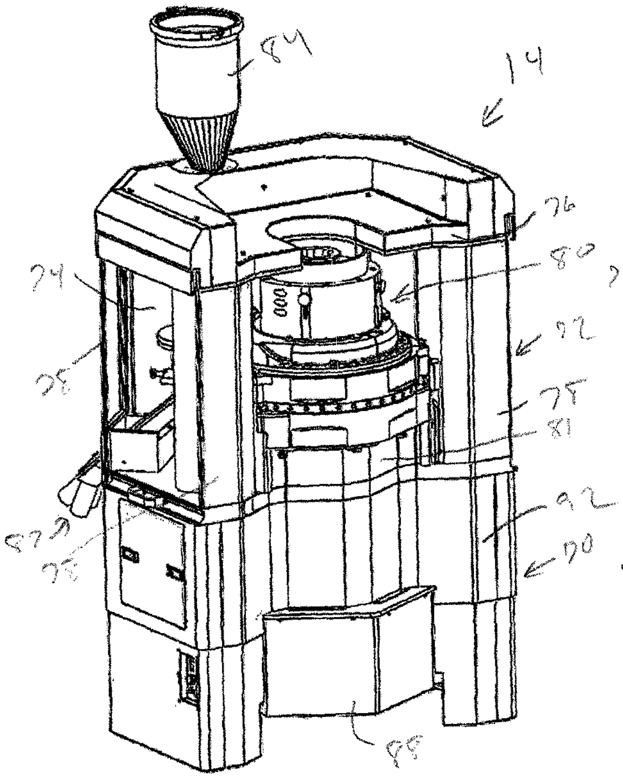
FIG. 7 is a right rear perspective view of the turret module of FIG. 2.
Figure 8:
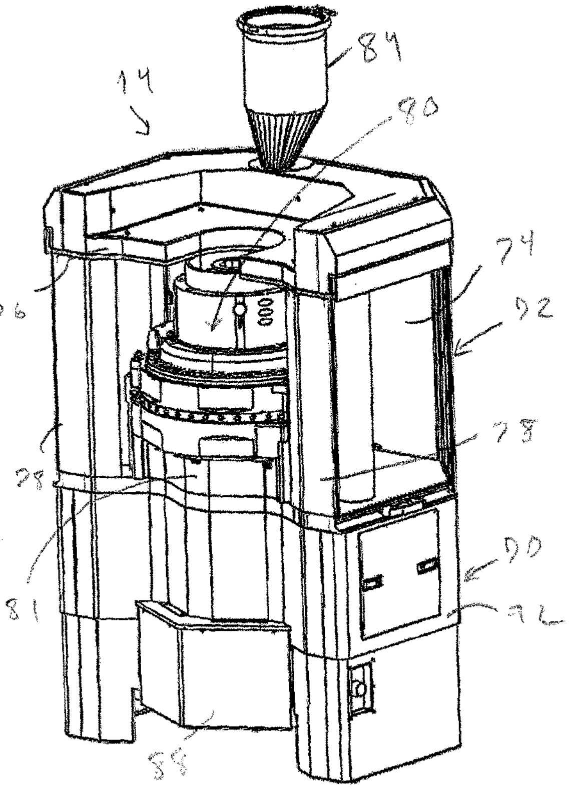
FIG. 8 is a left rear perspective view of the turret module of FIG. 2.

Referring to FIGS. 7 and 8, the turret module 14 is of a shape and size adapted to be received on the machine frame 12 within the inset 18. The specific details of the size and shape do not form part of the invention and may be specific to the overall design characteristics of the particular tablet press.

The turret module 14 comprises a module base 70 supporting a turret housing 72. A transparent outer wall 74 surrounds the front of the turret housing 72 to isolate the internal assemblies. The outer wall 74 may be of a clear polycarbonate material. The turret housing 72 has a top wall 76 supported on pillars 78 which are in turn supported on the module base 70. When the turret module 14 is secured to the machine frame 12, the turret module 14 is sealed by incorporating an upper enclosure via the outer wall 74. The back of the turret housing 72 is open to allow the pressure roll assemblies 36 and 38 to engage the upper and lower punches, as described below. The turret housing 72 may use conventional structure for sealing the turret housing 72 to the press housing 16.

In a rotary tablet press, a turret is rotatable about a vertical axis and carries a plurality of dies. Each die has associated top and bottom punches driven by top and bottom cams to compress the granulation into a tablet. An upper punch, a lower punch and a die are together referred to as a station. This is discussed below.

The turret housing 72 encloses a turret assembly 80. The turret assembly 80 is mounted to a support 81 which is in turn supported on the module base 70. The turret assembly 80 is rotatable relative to the support 81. The turret assembly 80 typically includes a die table and upper punch guide and lower punch guide assemblies. The turret module 14 houses the turret assembly 80 along with a cam body, cams, feeder, tablet discharge chute, and a hopper. As described below, the turret assembly 80 comprises chambers arranged circumferentially to hold upper punches, lower punches, and dies. As the turret assembly 80 rotates, punches follow a cam track and reciprocate into and out of dies that receive granulation as they are rotated under the feeder, as is conventional. A tablet is formed when the punches contact the pressure rolls 40, 42, 44 and 46 in FIG. 3, discussed above, causing compaction of the granulation in the die. This general operation is conventional, and the exact configuration will depend, in part, on the tablet being manufactured. The invention herein is particularly directed to the use of the detachable and removable turret module 14. This isolates the turret drive, compression assembly, and controls from the turret, feeder, hopper, chute, cams, and module base. Current presses have removable components (i.e. turret, feeder, hopper, chute and/or columns). The removable turret module feature is unique by creating a quick disconnect for faster changeover providing increased flexibility and versatility for changeover to different tooling sizes and/or turret sizes and configuration for bilayer and trilayer tableting, improved ease of cleaning and containment, and it eliminates impact of calibration when moving the press. Also, the turret top drive 62 in FIG. 17 moves the drive system for the turret to the top of the press.

Figure 17:
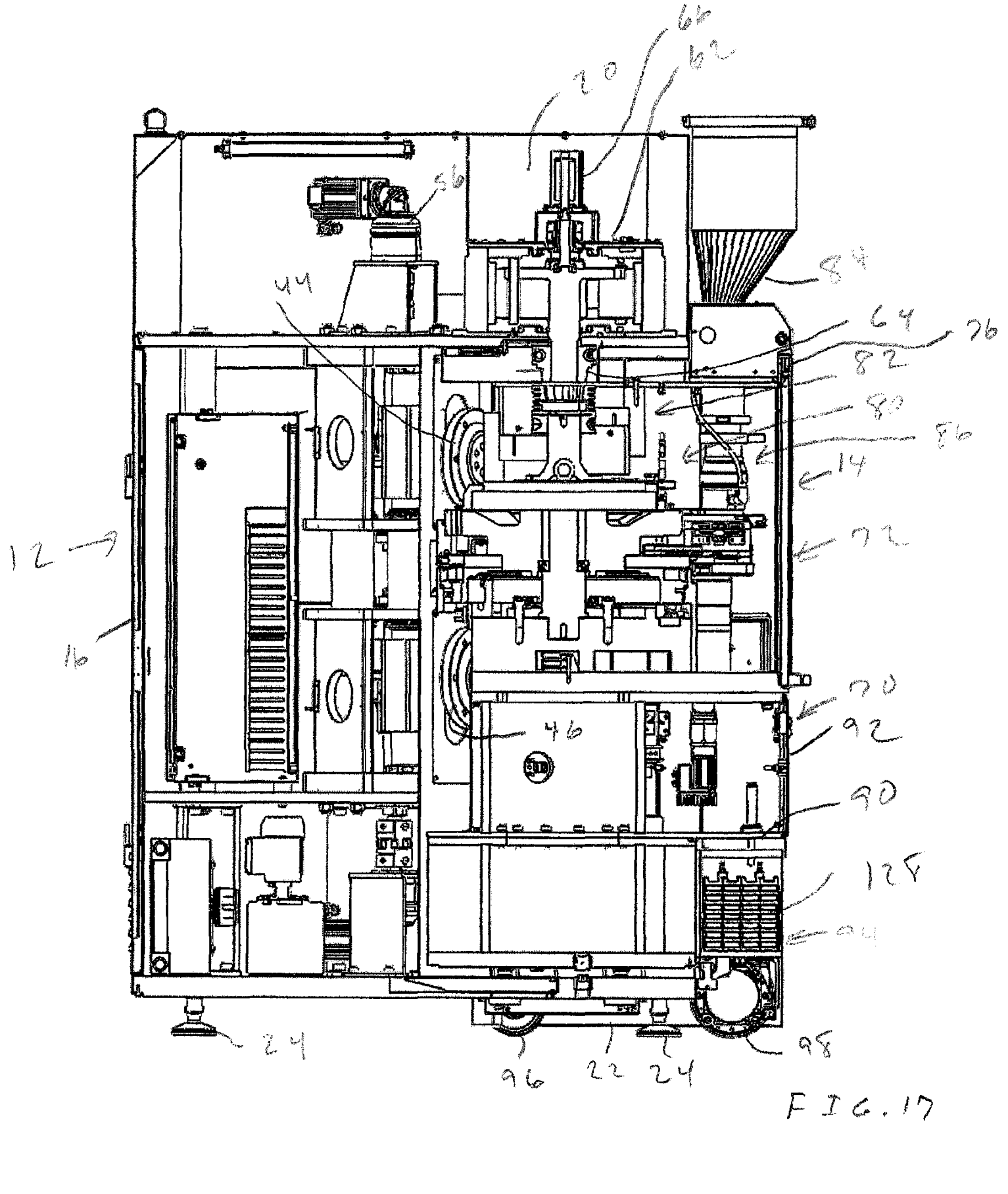
FIG. 17 is a sectional view taken along the line 17-17 of FIG. 11 with the turret module in the raised position.

In accordance with the invention, the turret assembly 80 is driven by an inlet coupling 82 on the top wall 76 engageable by the drive shaft 64, see FIG. 17, for driving the turret assembly 80 from above. A powder hopper 84 is provided in the top wall 76 for providing granulated powder to a feeder assembly 86. The feeder assembly 86 is driven by a feeder motor, not shown, to feed powder to the dies in a conventional manner. A tablet take-off (not shown) guides the tablet as it is ejected from the die into a discharge chute 87.

Figure 9:
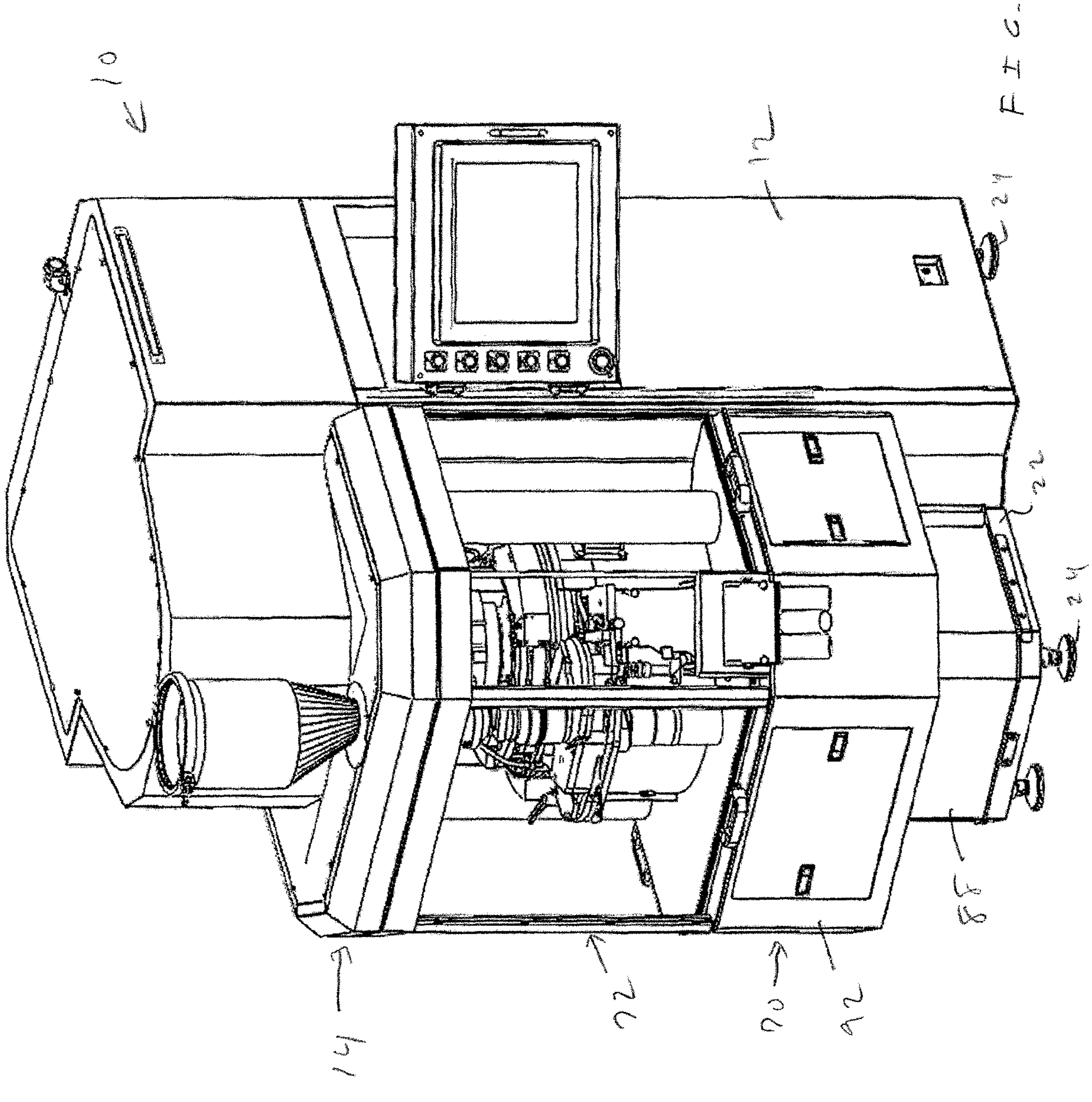
FIG. 9 is a perspective view of the rotary tablet press machine of FIG. 1, with an AGV cart removed from the turret module.

Referring to FIGS. 7 and 8, the module base 70 has a bottom support housing 88 for seating on the machine frame connection base 22, see FIG. 9. A weldment plate 90 is atop the support housing 88, see FIG. 15, and defines a bottom wall for a control housing 92. The control housing 92 cantilevers from the support housing 88 at the sides and front, see FIG. 9. An automated guided vehicle (AGV) cart 94 is of a generally U-shaped configuration, see also FIG. 10, and surrounds the support housing 88. The AGV cart 94 is supported by rear wheels 96 and front wheels 98. The front wheels are driven by a drive system 100. The AGV cart 94 may be an integral component of the module base 70 or may be detachable, as necessary or desired.

Figure 13:
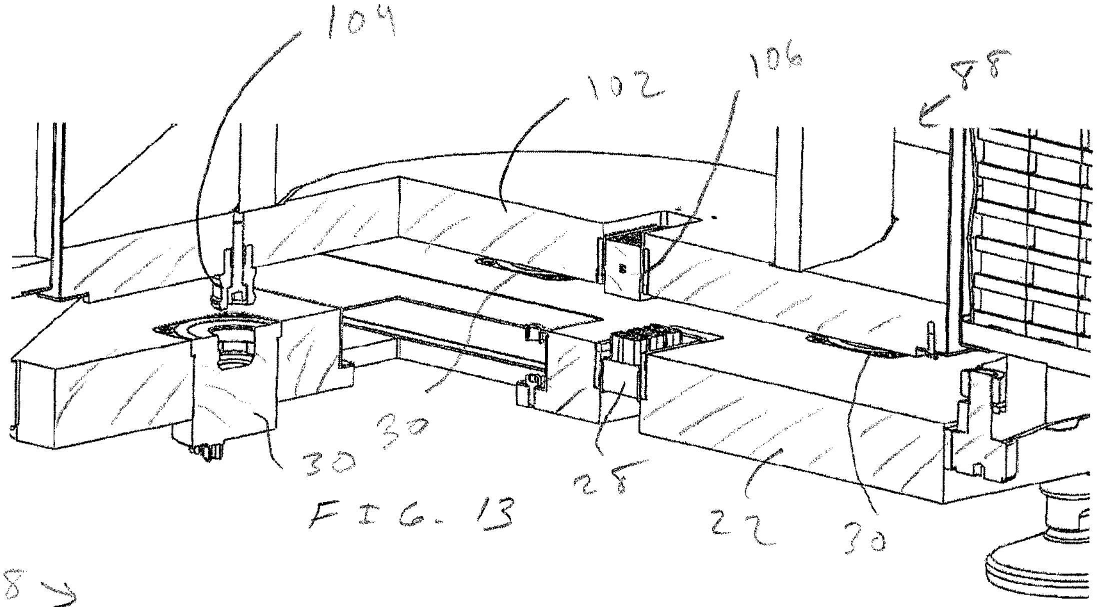
FIG. 13 is a cutaway/sectional rear perspective view, with parts removed for clarity, illustrating the turret module in a raised position and showing electrical and mechanical connection components disengaged.
Figure 14:
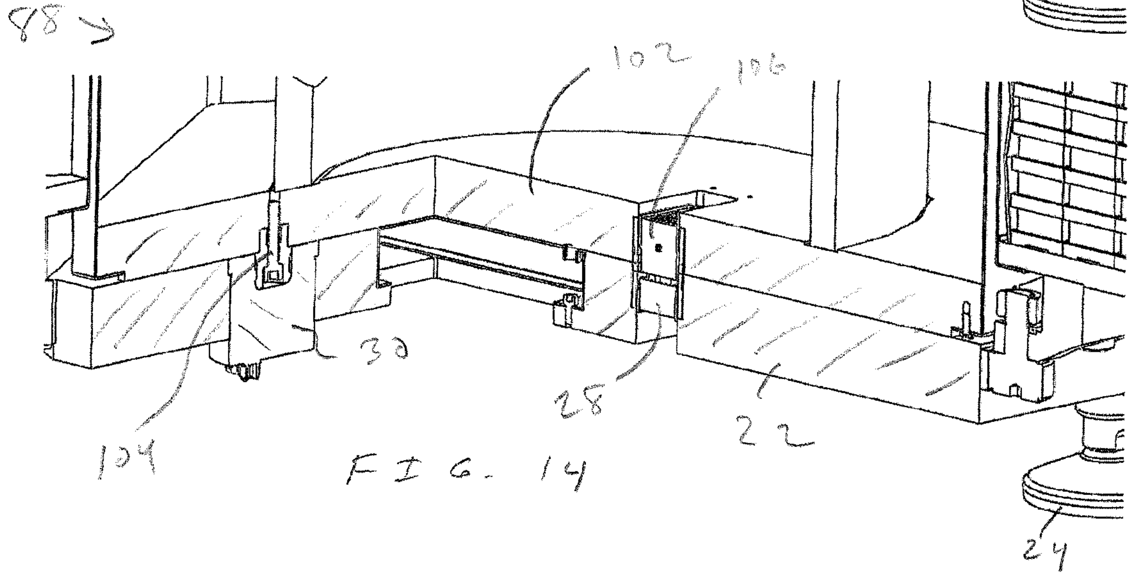
FIG. 14 is a cutaway/sectional rear perspective view, similar to FIG. 13, illustrating the turret module in a lowered position showing electrical and mechanical connection components engaged.

The support housing 88 has a bottom wall 102, see FIGS. 13 and 14. The bottom wall 102 includes four downwardly depending zero point clamp nipples, one of which is shown at 104. The nipples 104 are positioned to be in alignment with the four zero point clamp receivers 30. The bottom wall also includes a centrally located male electrical connector 106 mateable with the connection base female electrical connector 28. FIG. 13 illustrates the support housing 88 in the raised position with the nipples 104 and the male connector 106 spaced from the receivers 30 and the female connector 28. FIG. 14 illustrates the support housing 88 in the lowered position with the nipples 104 and the male connector 106 mated with the receivers 30 and the female connector 28, respectively. The nipples 104 and the receivers 30 comprise mechanical connectors to secure the module base 70 to the connection base 22. This raising and lowering of the support housing is done with the AGV cart 94, as described below.

Figure 3:
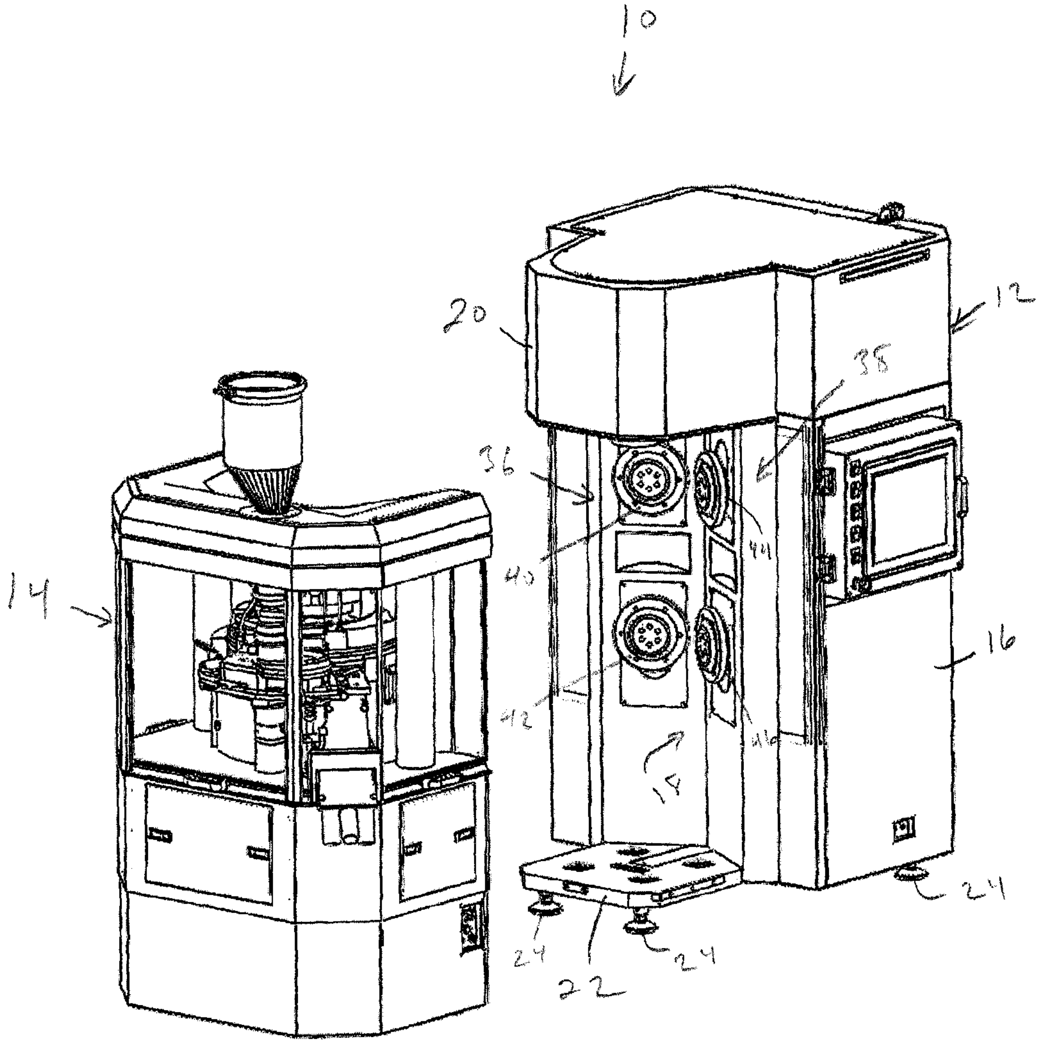
FIG. 3 is a perspective view of the press machine of FIG. 1 with the turret module detached from the machine frame.

With the module 14 positioned with the machine frame 12, as shown in FIGS. 1-3, the rollers 40, 42, 44 and 46 shown in FIG. 3, are positioned relative to the module 14 to engage the turret assembly 80 and contact punches, not shown, to compress the granulated powder to form a tablet, in a conventional manner.

Figure 10:
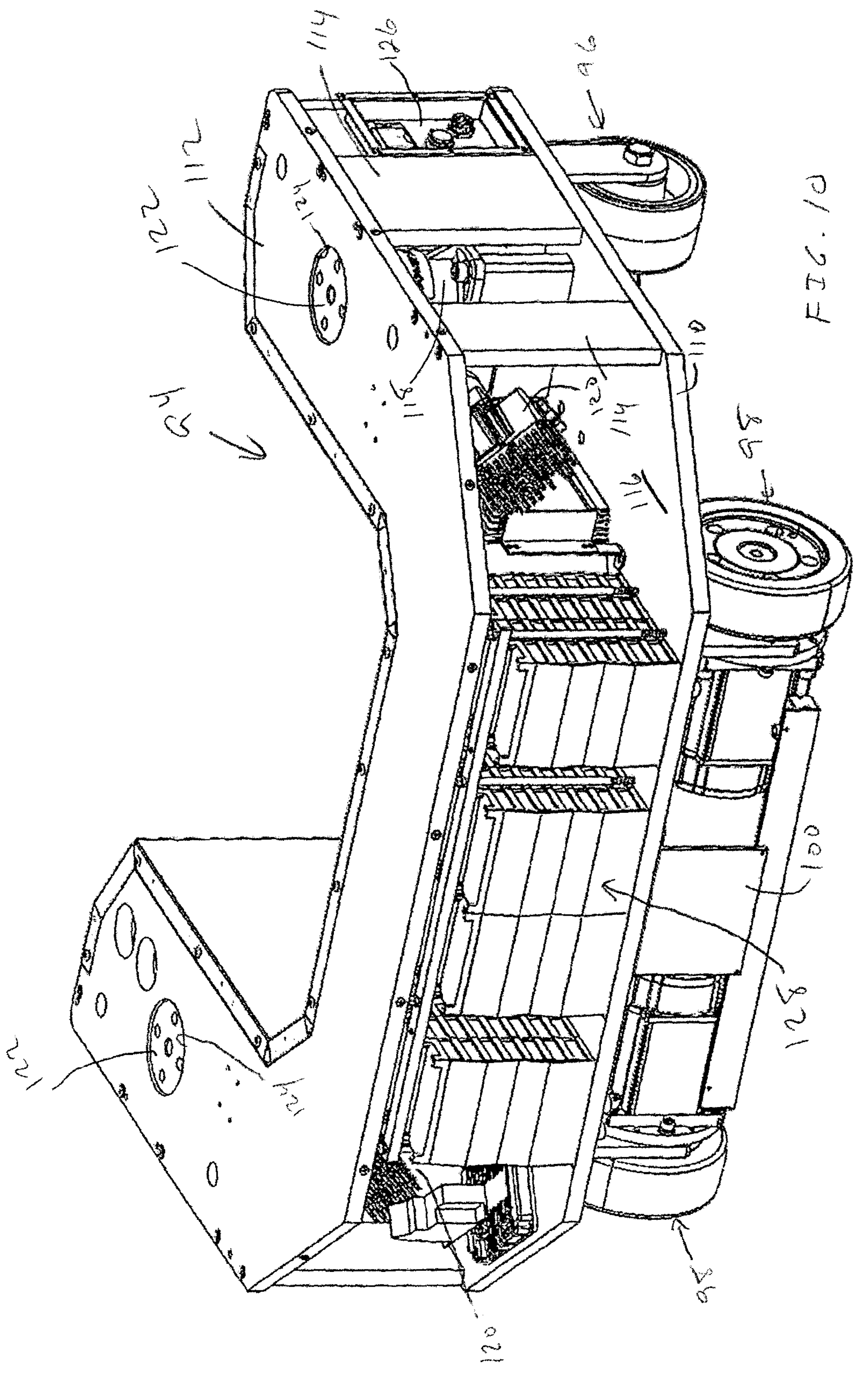
FIG. 10 is a perspective view of the AGV cart with a cover removed.

The AGV cart 94, shown in FIG. 10 with an outer wall 108, see FIG. 1, removed for clarity, includes a bottom wall 110 and a top wall 112 connected by supports 114 to define an interior space 116. The bottom wall 110 supports lifting mechanisms in the form of opposite jackscrews, one of which is shown at 118, in the interior space 116, each driven by a motor 120. Each jackscrew 118 drives a jack plate 122 that passes through an opening 124 in the top wall 112. The jack plates 122 engage with and are secured to the weldment plate 90, such as by fasteners, not shown, see FIG. 15. Thus, the jackscrews 118 are controlled to raise and lower the weldment plate 90, and in turn raise and lower the module base 70. The motors 120 are controlled by a cart control 126. The cart control 126 is powered by batteries 128 in the interior space 116. A control pad 130, see FIG. 23, may include a joy stick, or push buttons, or the like, for commanding operation of the AGV cart 94 as by driving the wheel drive 100.

The illustrated embodiment uses jackscrews 118 for raising and lowering the module base 70. Alternatively, the AGV cart could utilize a design that incorporates hydraulic lifting using a hydraulic pump, reservoir, valves, flow divider, and plural cylinders.

Figure 19:
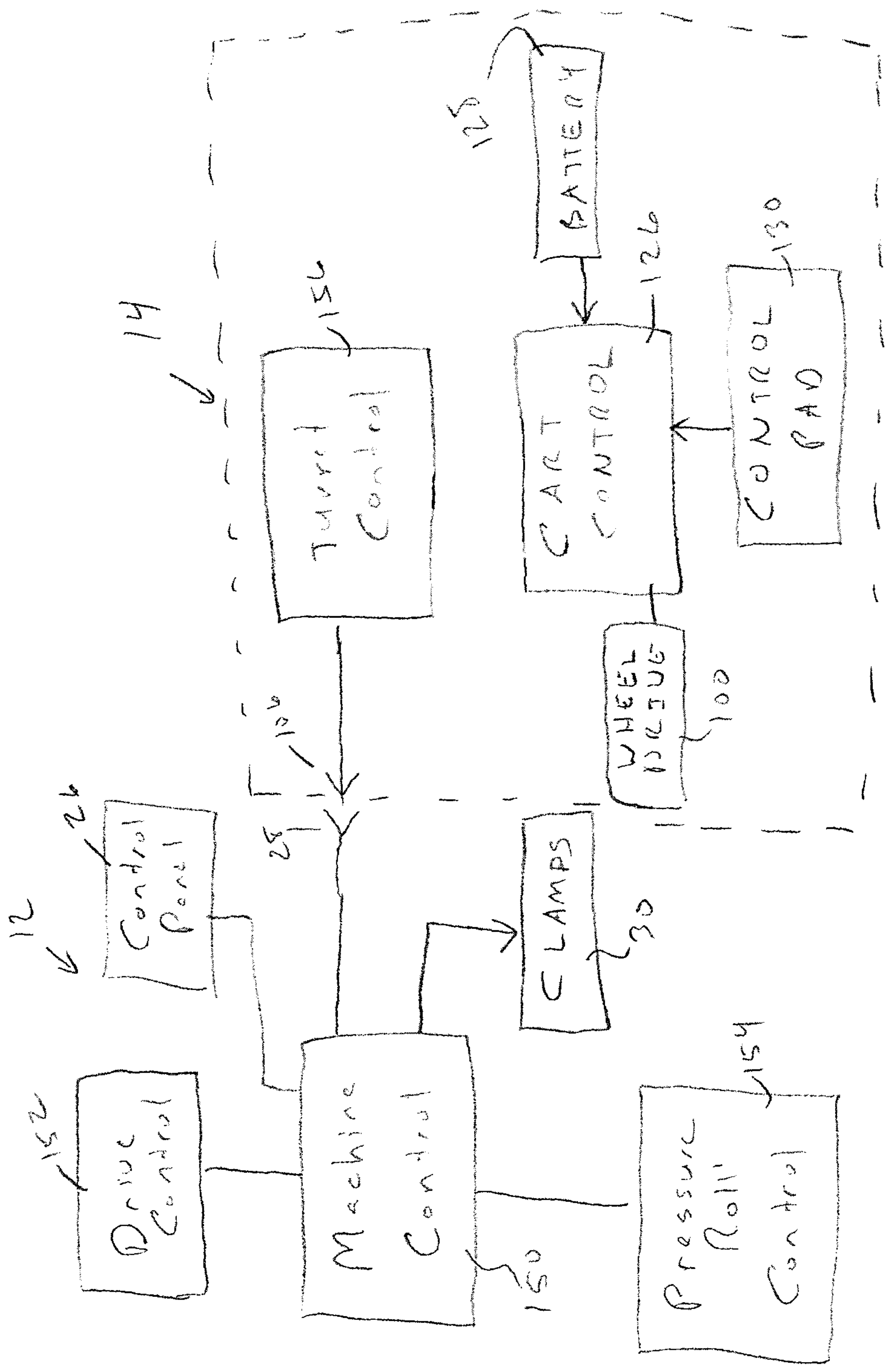
FIG. 19 is a block diagram of a control system for the rotary tablet press of FIG. 1.

FIG. 19 is a block diagram for a control system for the tablet press 10. The machine frame press housing 16 houses a machine control 150. The machine control 150 comprises a programmed processing system using a processor and memory, as is conventional, for controlling overall operation of the tablet press 10, as necessary or desired. The machine control 150 is operatively associated with a drive control 152 for controlling the drive motor 62 and a pressure roll control 154 for controlling the linear drives 56 and related devices. The machine control 150 also controls the clamps 30. The clamps 30 are referenced above as zero point clamp receivers. These receivers 30 and associated nipples 104 may be as manufactured by Roemheld as models S5000 and SCR5000. As will be apparent, other clamping devices could be used. The electrical connectors 28 and 106 may be, for example, industrial quick connectors as provided by Harting Technology Group.

The machine control 150 is selectively connected via the connectors 28 and 106 to a turret control 156 in the turret module control housing 92. The turret control 156 controls operation of devices in the turret module 14 as necessary or desired. As the present invention is related particularly to features of securing the detachable module 14 to the machine frame 12, the details of the overall operation of the machine control 150 and the turret control 156 are not discussed herein.

Figure 20:
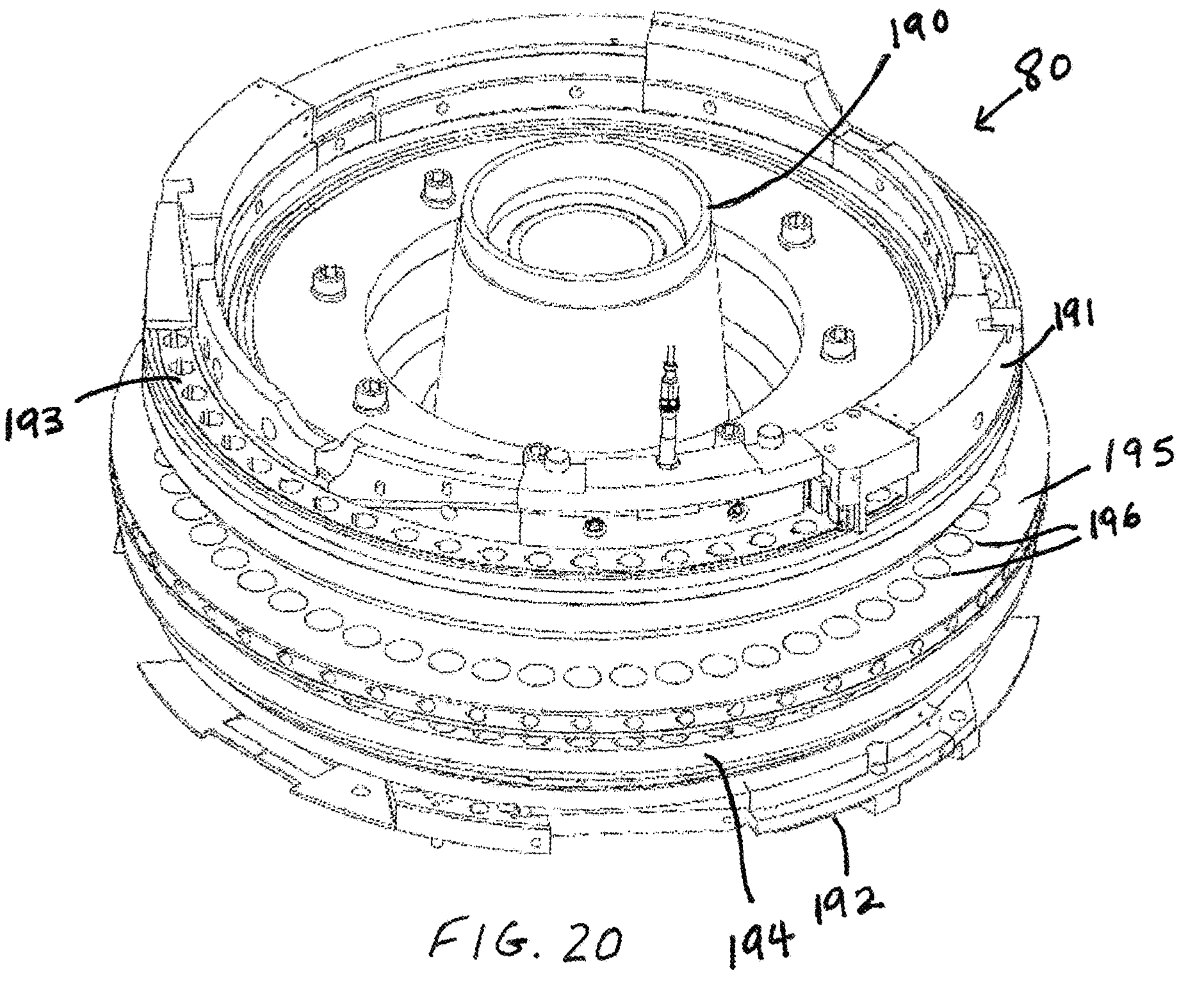
FIG. 20 is an exemplary turret assembly used in the tablet press of FIG. 1.

FIG. 20 illustrates an exemplary turret assembly 80. The turret assembly 80 includes an upper cam body 190 which is driven by the drive shaft 64. An upper cam track assembly 191, lower cam track assembly 192, an upper turret section 193 (for upper punches), a lower turret section 194 (for lower punches) and a die table 195 are operatively secured to the upper cam body 190. Only the turret sections and installed punches and dies rotate. The cams (individual parts) or cam tracks (combination of cams in upper and lower segments) do not rotate, as is known. The upper punches (not shown) are operated by the upper cam track assembly 191 in a conventional manner. The lower punches (not shown) are operated by the lower cam track assembly 192 in a conventional manner. The die table 195 includes plural openings 196 each for receiving a die (not shown). As the turret assembly 80 rotates, the punches follow the respective cam tracks 191 and 192 and reciprocate relative to the dies. Each die receives granulation as they are rotated under the feeder assembly 86. A tablet is formed when the punches contact the upper rollers 40 and 44 and the lower rollers 42 and 46, as is known, causing compaction of the granulation in the die. The upper punches are then raised by the upper cam track 191 and ejected by the lower cam track 192 causing the lower punches to be raised. This general operation is conventional, and the exact configuration will depend, in part, on the tablet being manufactured.

In accordance with the invention, a manufacturer may have a plurality of different turret modules for use with a single machine frame 12. Each module can have a different turret assembly and appurtenances depending on the type of tablet to be produced. There will be at least four total configurations for this machine design utilizing a machine frame with compression and drive assemblies with a removable module including a turret, feeder, tablet discharge chute, hopper and cam assemblies. Each will offer different turret configurations. Also, different configurations of the machine frame 12 may be provided with different number and configuration of compression roller assemblies, as discussed below.

For example, the rotary tablet press in accordance with the invention may be configured to be Single Layer & Single Sided (one feeder, one product); Single Layer & Double Sided (two feeders, two products); Bilayer (two feeders, one product); and Trilayer (three feeders, one product). A single sided press has only one feeder, and it is designed to make a single layer tablet. It is designed with two equal size compression assemblies for pre-compression and main compression. A triple sided press has three feeders, and it is designed to make a triple layer containing three different granulations. It is designed with one large compression assembly for main compression.

Figure 4:
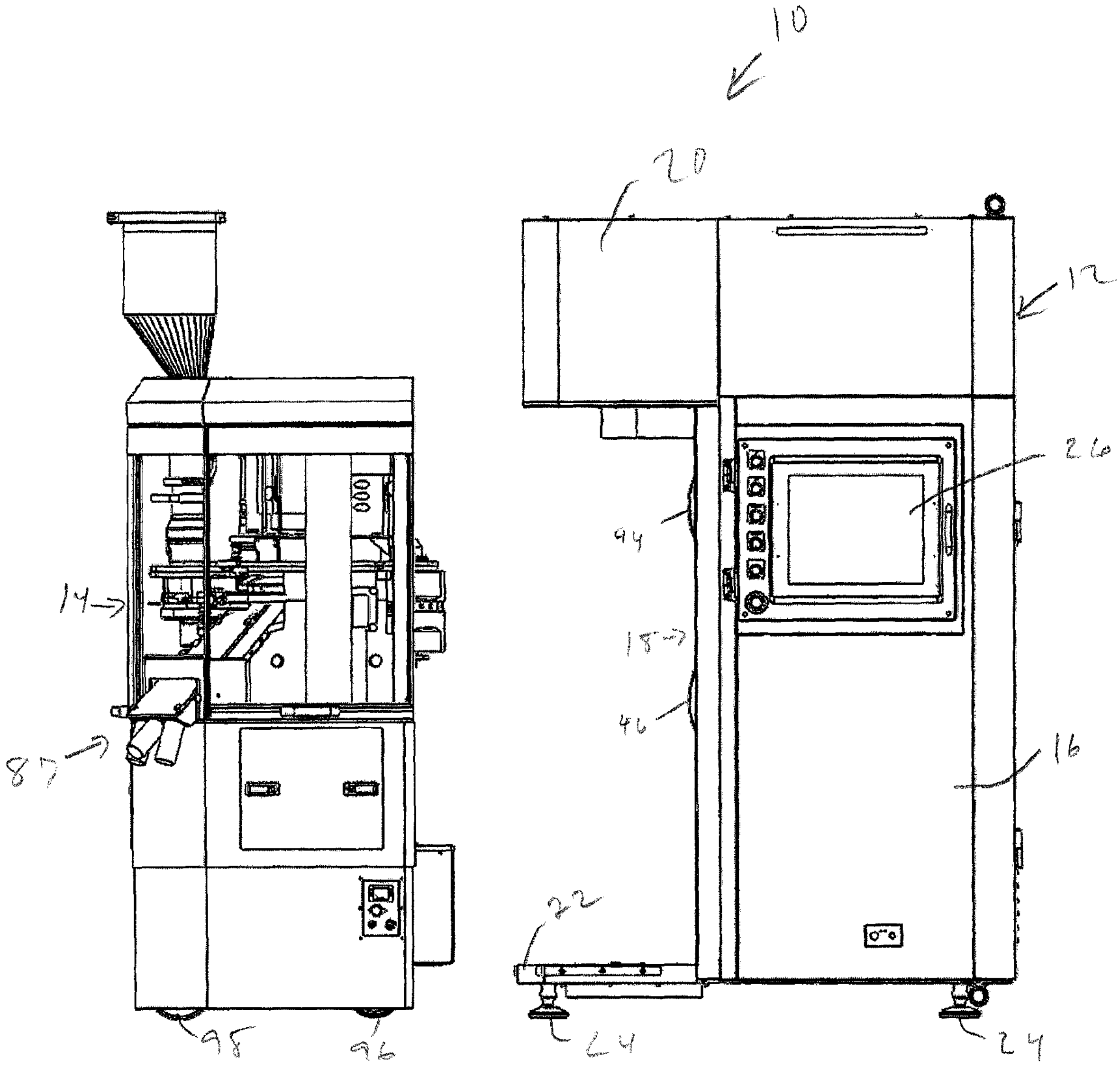
FIG. 4 is a right side view of the press machine of FIG. 3.
Figure 5:
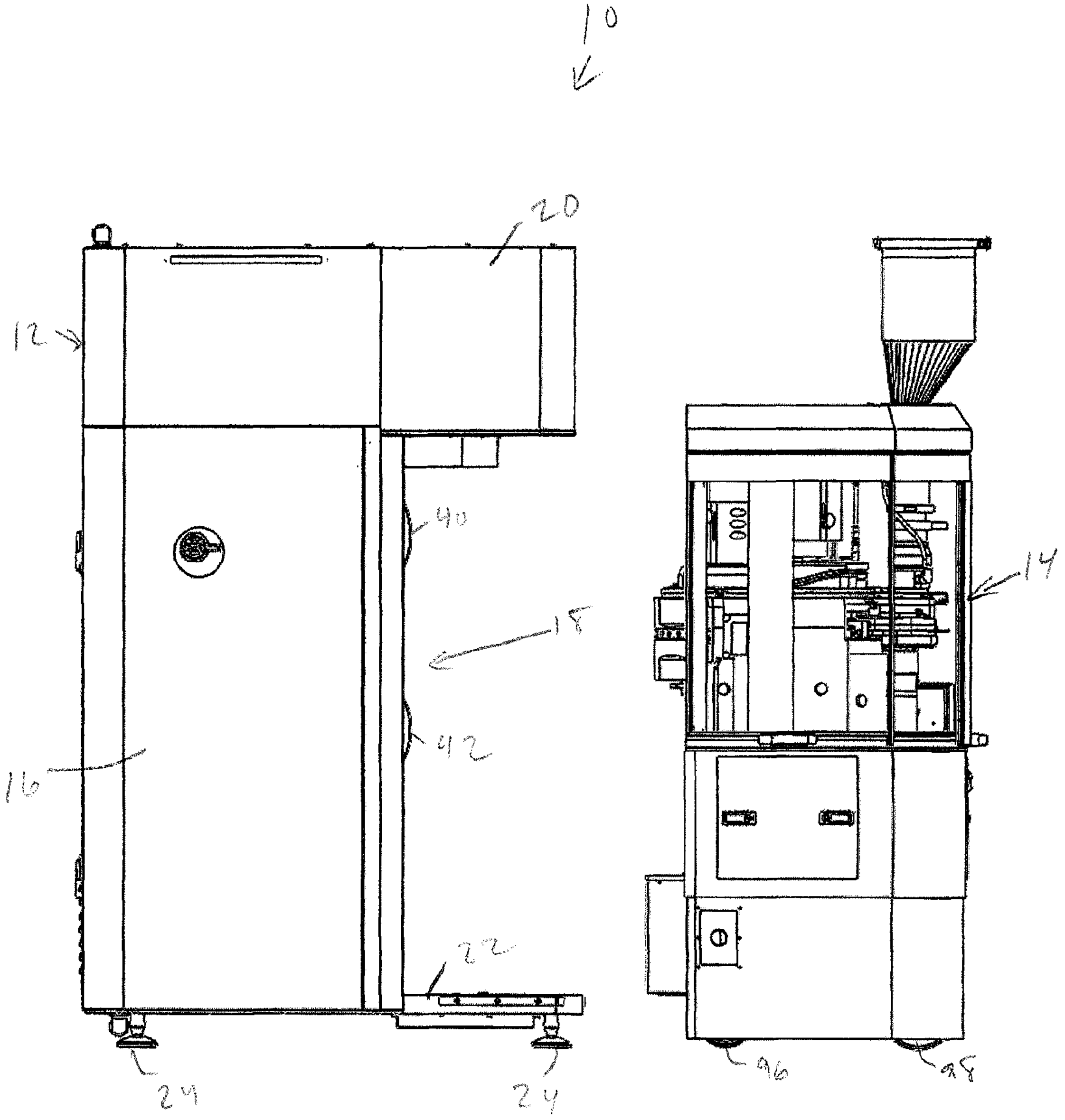
FIG. 5 is a left side view of the press machine of FIG. 3.
Figure 12:
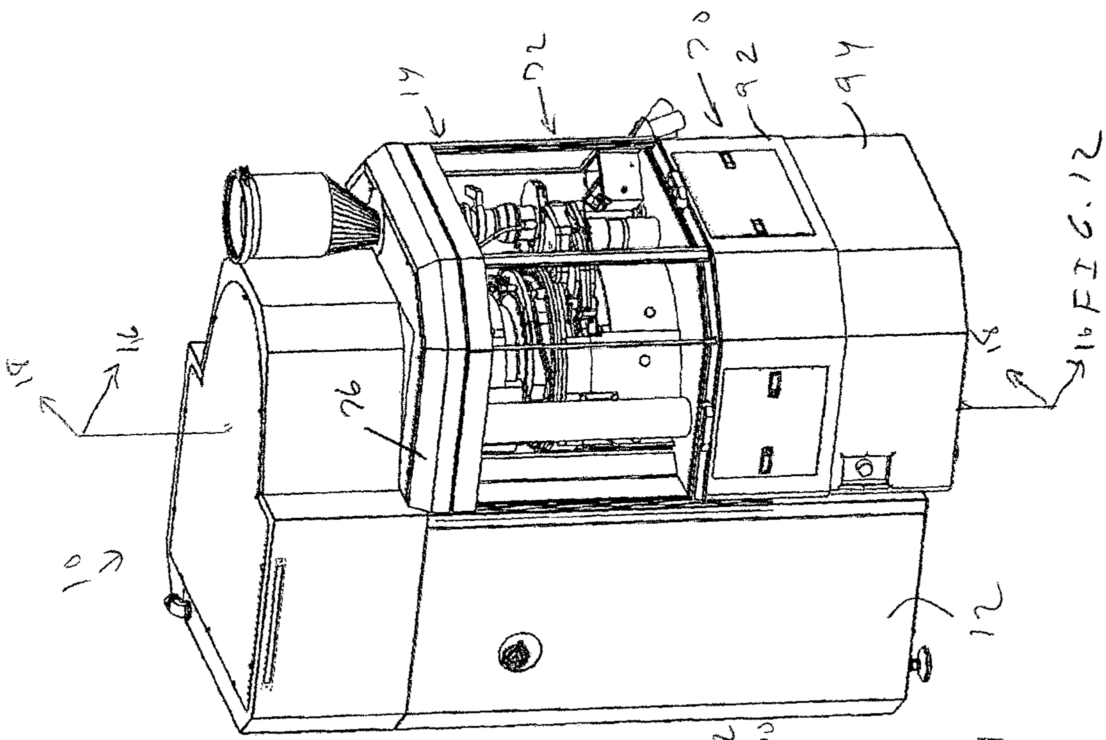
FIG. 12 is a perspective view of the press machine of FIG. 1 with the turret module in a lowered position.
Figure 11:
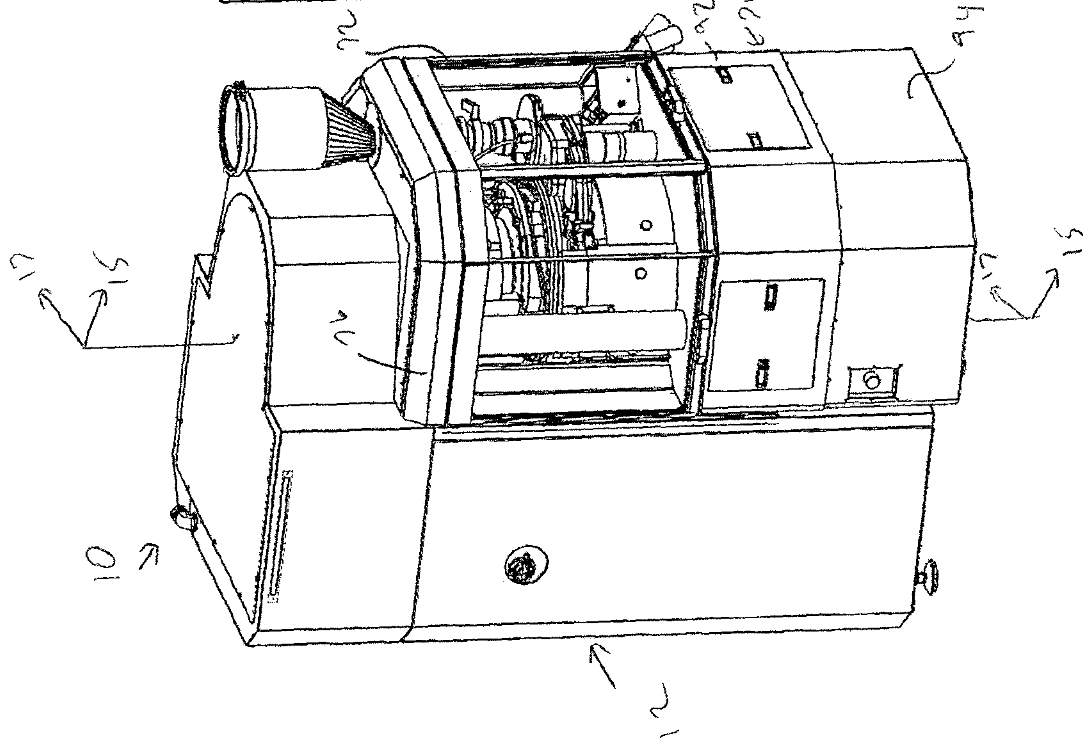
FIG. 11 is a perspective view of the press machine of FIG. 1 with the turret module in a raised position.
Figure 15:
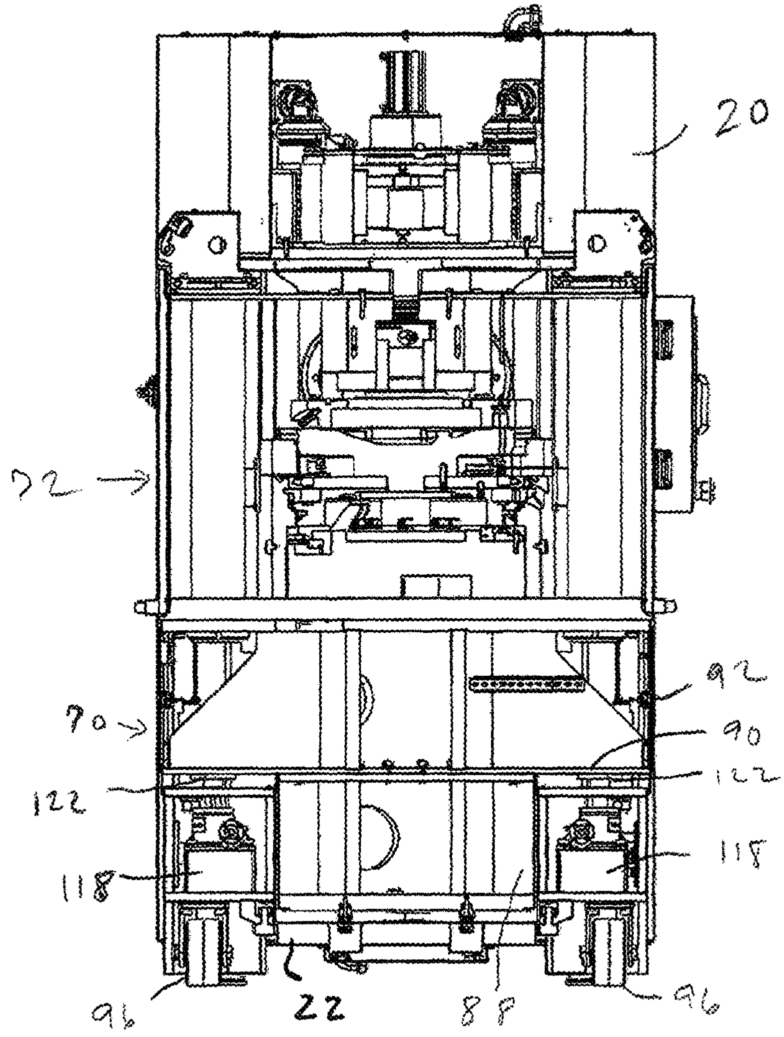
FIG. 15 is a sectional view taken along the line 15-15 of FIG. 11 with the turret module in the raised position.
Figure 16:
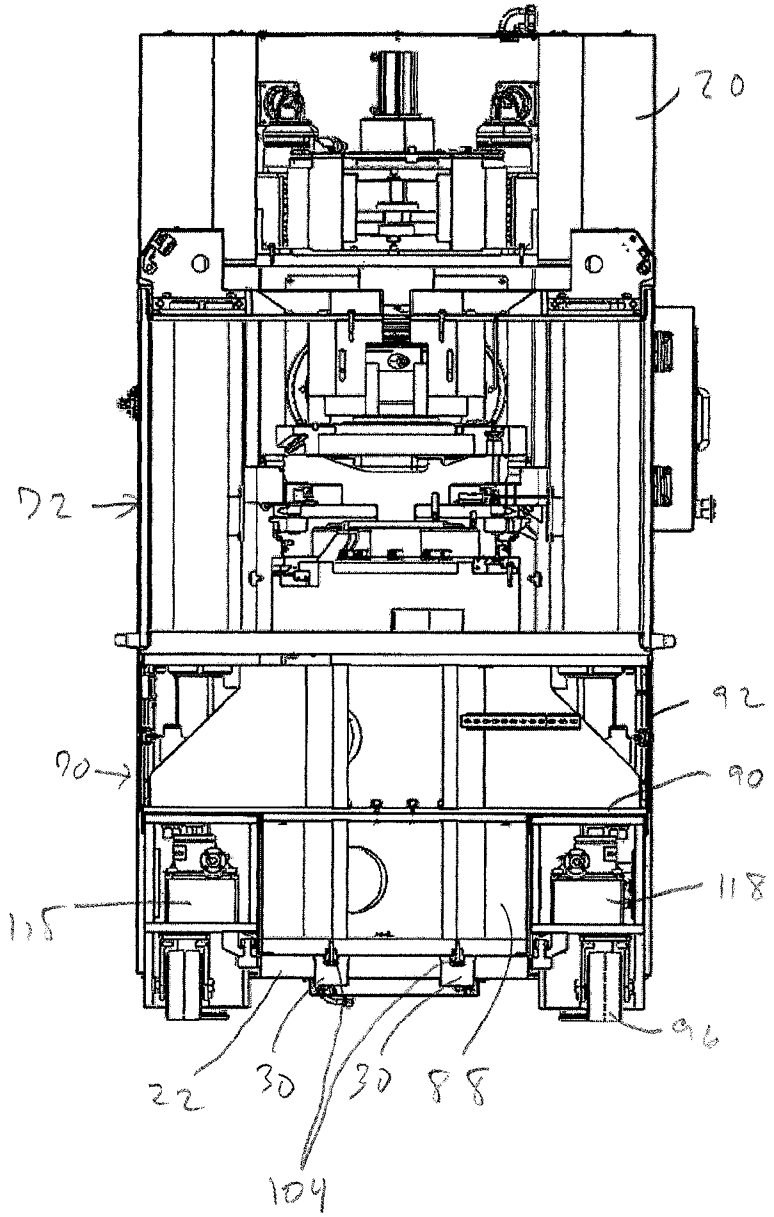
FIG. 16 is a sectional view taken along the line 16-16 of FIG. 12 with the turret module in the lowered position.
Figure 18:
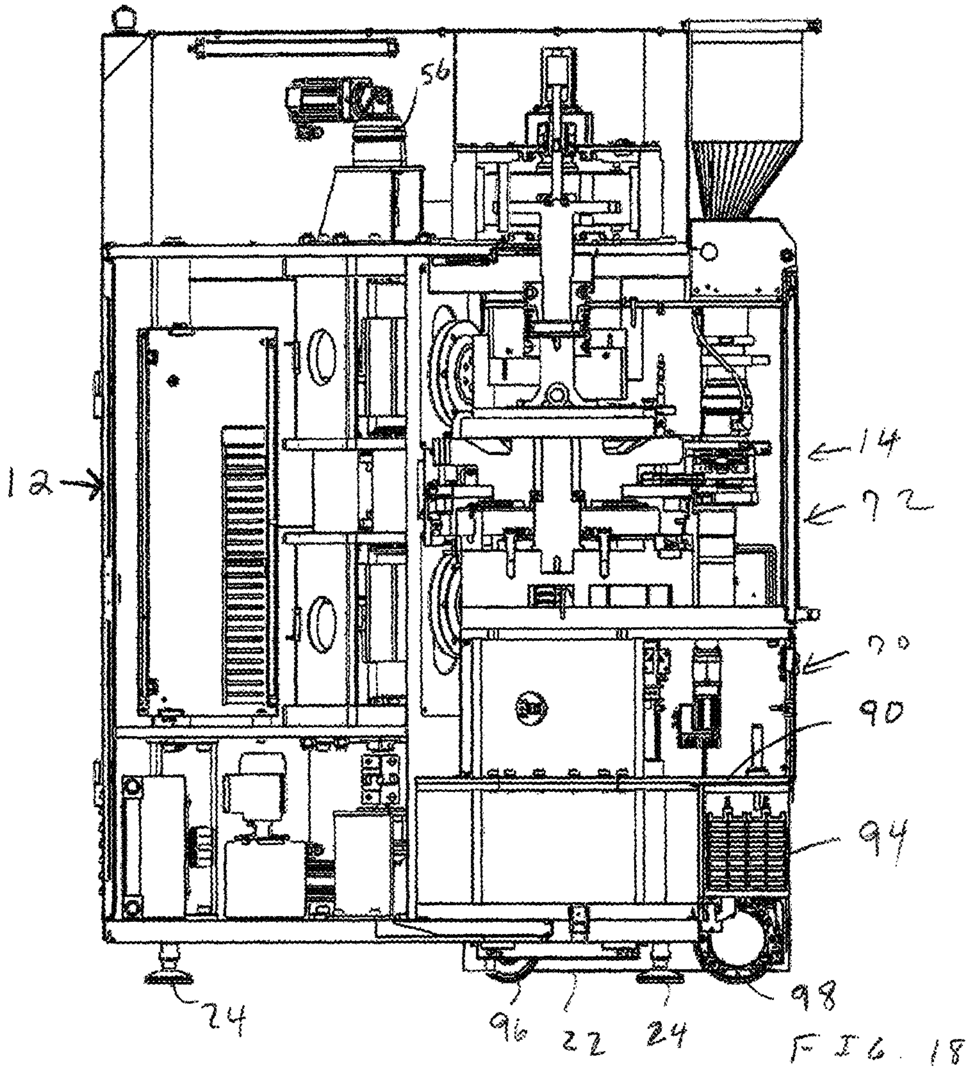
FIG. 18 is a sectional view taken along the line 18-18 of FIG. 12 with the turret module in the lowered position.

FIGS. 1 and 2 illustrate the detachable module 14 engaged with the machine frame 12 in an operating position. FIGS. 3-5 illustrate the turret module 14 detached and removed from the machine frame 12 for a cleaning or maintenance operation, or the like. To remove the turret module 14 from the machine frame 12, the drive shaft 64 must be raised and the zero point clamp receivers 30 must be deenergized. The turret module 14 is then raised by the AGV cart 94. The AGV cart 94 is then driven to separate the turret module 14 from the machine frame 12. The turret module 14 can then be lowered for stability. Similarly, to couple the turret module 14 to the machine frame 12, the AGV cart 94 must first raise the turret module 14, and then drive the turret module 14 so that the support housing 88 is above the connection base 22, and then lower the turret module 14. FIGS. 11, 15 and 17 illustrate the turret module 14 in the raised position relative to the connection base 22, and thus the machine frame 12. FIGS. 12, 16 and 18 illustrate the turret module 14 in the lowered position relative to the connection base 22, and thus the machine frame 12. This is most apparent by comparing the position of the turret housing top wall 76 in FIG. 11 to that in FIG. 12, and comparing position of the weldment plate 90 in FIGS. 15 and 17 to that in FIGS. 16 and 18.

As described in the illustrated embodiments, a rotary tablet press comprises a machine frame and detachable turret module. Granulation is fed into the module from a hopper and travels into the feeder chamber. The machine frame comprises motorized pressure roll assemblies and a turret drive assembly. The detachable turret module comprises a module base, turret base, turret, cam body, cams, feeder, tablet discharge chute, hopper, upper enclosure, and guard doors. The rotary turret comprises upper punches, dies, and lower punches. As the turret rotates, the dies move underneath the feeder chamber. The rotary feeder paddles move the granulation and assist with feeding powder to the dies. Punches travel along cam tracks as the turret rotates and compresses the powder into a tablet when the punches contact the pressure rolls. An ejection cam pushes the lower punch in the upward direction and a take-off bar mounted just above the die table directs the tablet into a discharge chute. The detachable module is sealed by incorporating an upper enclosure.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A rotary tablet press comprising:

a machine frame comprising a press housing and a compression assembly in the press housing including pressure roll assemblies, and a connection base extending outwardly from the press housing;

a detachable turret module removably mountable to the press housing comprising a module base supporting a turret housing, a turret assembly rotatably mounted in in the turret housing about a vertical axis, the turret assembly comprising a plurality of die stations, the detachable module being selectively positioned at the press housing so that the pressure roll assemblies engage the turret assembly to compress a granulation into a tablet at the die stations; and a cart assembly operatively secured to the module base and comprising a controllable lifting mechanism for raising and lowering the turret module to selectively position the module base on the connection base.

2. The rotary tablet press of claim 1 wherein the connection base and the module base comprise mechanical connectors to secure the module base to the connection base.

3. The rotary tablet press of claim 2 wherein the mechanical connectors comprise zero point clamp receivers in the connection base and zero point clamp nipples on the module base.

4. The rotary tablet press of claim 1 wherein the connection base and the module base comprise electrical connectors to electrically connect a machine control in the press housing to a turret control in the module base.

5. The rotary tablet press of claim 4 wherein the electrical connectors comprise male and female quick connectors.

6. The rotary tablet press of claim 1 wherein the cart is removably mounted to the module base.

7. The rotary tablet press of claim 1 wherein the cart comprises a housing enclosing the lifting mechanism and batteries for powering the lifting mechanism.

8. The rotary tablet press of claim 7 wherein the lifting mechanism comprises a plurality of jackscrews.

9. The rotary tablet press of claim 1 wherein the module base comprises a weldment plate supported on the jackscrews to be raised and lowered thereby to selectively mount the detachable module to the press housing.

10. The rotary tablet press of claim 1 wherein the cart assembly comprises wheels for moving the turret module toward and away from the press housing.

11. A rotary tablet press comprising:

a machine frame comprising a press housing and a compression assembly in the press housing including pressure roll assemblies, and a connection base extending outwardly from a bottom end of the press housing;

a detachable turret module removably mountable to the press housing comprising a module base including a control housing atop a support housing and a turret housing mounted atop the control housing, a turret assembly rotatably mounted in in the turret housing about a vertical axis, the turret assembly comprising a plurality of die stations, the detachable module being selectively positioned at the press housing so that the pressure roll assemblies engage the turret assembly to compress a granulation into a tablet at the die stations;

a turret drive assembly comprising a turret motor and drive shaft, the drive shaft being aligned with the vertical axis and engaging the turret assembly to rotate the turret assembly; and a cart assembly operatively secured to the module base and comprising a controllable lifting mechanism for raising and lowering the turret module to selectively position the module base on the connection base.

12. The rotary tablet press of claim 11 wherein the connection base and the support housing comprise mechanical connectors to secure the module base to the connection base.

13. The rotary tablet press of claim 12 wherein the mechanical connectors comprise zero point clamp receivers in the connection base and zero point clamp nipples on the support housing.

14. The rotary tablet press of claim 11 wherein the connection base and the module base comprise electrical connectors to electrically connect a machine control in the press housing to a turret control in the control housing.

15. The rotary tablet press of claim 14 wherein the electrical connectors comprise male and female quick connectors.

16. The rotary tablet press of claim 11 wherein the cart is removably mounted to the module base.

17. The rotary tablet press of claim 11 wherein the cart comprises a housing enclosing the lifting mechanism and batteries for powering the lifting mechanism.

18. The rotary tablet press of claim 17 wherein the lifting mechanism comprises a plurality of jackscrews.

19. The rotary tablet press of claim 11 wherein the support housing comprises a weldment plate supported on the jackscrews to be raised and lowered thereby to selectively mount the turret module to the press housing.

20. The rotary tablet press of claim 11 wherein the cart assembly comprises wheels for moving the turret module toward and away from the press housing.

* * * * *